United States Patent [19]
Humphrey et al.

[11] Patent Number: 6,036,991
[45] Date of Patent: Mar. 14, 2000

[54] BLACK LEAF TEA

[75] Inventors: Philip Graham Humphrey, Raunds; Paul Thomas Quinlan, Kempston, both of United Kingdom

[73] Assignee: Lipton, Division of Conopco, Inc., Englewood Cliffs, N.J.

[21] Appl. No.: 08/982,051

[22] Filed: Dec. 1, 1997

[30] Foreign Application Priority Data

Nov. 29, 1996 [EP] European Pat. Off. .............. 96308675

[51] Int. Cl.$^7$ ................................. A23F 3/00; A23B 7/10
[52] U.S. Cl. .............................................. 426/597; 426/49
[58] Field of Search ....................... 426/597, 49

[56] References Cited

U.S. PATENT DOCUMENTS

| | | | |
|---|---|---|---|
| 4,748,033 | 5/1988 | Syfert et al. | 426/330 |
| 5,612,079 | 3/1997 | Lunder | 426/597 |

FOREIGN PATENT DOCUMENTS

| | | |
|---|---|---|
| 654221 A1 | 5/1995 | European Pat. Off. . |
| 05139472 | 8/1993 | Japan . |
| 1102554 | 7/1984 | U.S.S.R. . |
| 1165346 | 7/1985 | U.S.S.R. . |
| 1364269 | 1/1988 | U.S.S.R. . |
| 1472036 | 4/1989 | U.S.S.R. . |
| 4831 | 2/1913 | United Kingdom . |
| WO 9603054 | 2/1996 | WIPO . |

OTHER PUBLICATIONS

Database Abstract. AN:92–291472 [35] WPIDS from SU 1683638. Applicant: Substropical Culture Tea Ind. Assoc., Oct. 1991.
European Search Report in Patent Application No. EP 96 30 8675.
Journal of Agricultural and Food Chemistry, col. 44, No. 6., Jun. 1, 1996, pp. 1387–1394 XP000588764 Yu–Li Lin et al., "Composition of Polyphenols in Fresh Tea Leaves and Associations of their Oxygen–Radical–AbsorbingCapacity with Antipoliferative Actions in Fibroblast Cells.".
International Search Report dated Mar. 17, 1998.
Two and a Bud, vol. 32, No. 1, 1985, pp. 60–62, Abstract, "Aroma constituents of Assam and China hybrid teas and their manifestation during processing".
Flavour and Fragrance Journal, vol. 8, No. 4, 1993, pp. 173–178, Abstract, "Identification of potent odourants in static headspace samples of green and black tea powders on the basis of aroma extract dilution analysis".

*Primary Examiner*—Anthony J. Weier
*Attorney, Agent, or Firm*—James J. Farrell

[57] ABSTRACT

A leaf tea especially blended from a black tea and a green tea so that it contains catechins and phenols in a ratio between 0.15 to 0.4, but preferably between 0.2 and 0.3. Such a product resembles black tea but typically possesses an antioxidant activity that is 10% or more higher than that the same mass of the black tea alone. The black tea is preferably low grown while the green tea is preferably from an Assam jat.

12 Claims, No Drawings

BLACK LEAF TEA

The present invention relates to a leaf tea that looks and tastes like a black tea but contains an uncharacteristically high amount of catechins. Such a product can be made by blending a carefully selected combination of black and green teas.

BACKGROUND AND PRIOR ART

With the exception of water, tea is the most widely consumed of all beverages. In fact, the worldwide per capita consumption has been estimated at 0.1 litre per day.

Most of the tea consumed in the Western World is so called black tea which is obtained by harvesting new leaves of the plant *Camellia sinensis* and withering, rolling, enzymatically oxidizing, firing and sorting them. However the leaves can be processed without the oxidation step to produce what is known as green tea. Such tea is widely consumed in parts of the People's Republic of China, Japan, North Africa and the Middle East. In another variation oolong tea is prepared by partial oxidation. That is also commonly consumed in parts of the People's Republic of China.

Tea leaves contain a large number of enzymes, biochemical intermediates and structural elements normally associated with plant growth and photosynthesis together with substances that are responsible for the characteristics of tea itself. These include flavanols, flavanol glycosides, polyphenolic acids, caffeine, amino acids, mono- and polysaccharides, proteins, cellulose, lipids, chlorophylls and volatiles.

Flavanols or more specifically flavan-3-ols tend to constitute up to 30% of the dry weight and are known as catechins. Amongst them, epigallocatechin-3-O-gallate (herein "EGCG") is predominant (10–15% of dry weight), and the other major components are epicatechin (1–3%), epigallocatechin (3–5%) and epicatechin-3-O-gallate (3–5%). Green tea retains most of EGCG as well as other catechins, but their content in black tea is greatly reduced (ca. 5%) due to both chemical and enzymatic oxidations taking place in the black tea production to give theaflavins and thearubigins.

EGCG has been claimed to possess a variety of biological activities. Its supposed anti-tumour activities receives an increasing scientific attention. Some of the other catechins may have other useful biological activities.

Tea contains many other phenols. These include gallic acid, flavanols such as quercetin, kaemferol, myricetin, and their glycosides; and depsides such as chlorogenic acid and para-coumarylquinic acid. Some of these are believed to participate in the chemical reactions that occur during fermentation.

Green tea contains many more catechins than black tea. However despite the burgeoning health consciousness amongst may consumers green tea is usually dismissed in Western countries as being too pale and unpleasant to taste. Furthermore it is typically slow to infuse and therefore not suitable for the Western desire for convenience for the sake of quality.

The present inventors have solved these problems by preparing a leaf tea comprising a blend of a first substantially fermented tea and a second substantially unfermented tea, characterised in that the blend contains catechins and phenols in a ratio of between 0.15 to 0.4, but preferably between 0.2 and 0.3. Such a leaf tea will resemble black tea but typically possess an antioxidant activity that is 10% or more higher than that the same mass of the black tea.

Blending black and green teas is known.

In U.S. Pat. No. 4,748,033 (Syfert) 90% Tender Leaf black tea is blended with 10% Taiwanese green tea and an extract therefrom is processed to give a tea concentrate having freeze thaw stability and enhanced cold water soluble. There is no disclosure of catechin to phenol ratios.

EP 654 221 (Nestlé) discloses a process for making instant black tea that involves blending green and black teas in mixtures of 4:1 to 2:1. But there is no disclosure of catechin to phenol ratios or any apparent selection of teas.

SU 1,102,554 (Tea Industrial Research Institute) discloses a method for making a tea concentrate that involves extracting a mixture of fermented and unfermented tea in ratios of 1:1 to 4:1. This apparently provides an improvement in taste and aroma.

SU 1,364,269 (Tea Industrial Research Institute) discloses adding green Baikhal tea to black Baikhal tea to improve the organoleptic properties of the final products. Once again there is no discussion of catechin to phenol content.

SU 1,165,346 (Khoperiya) discloses a method for improving the quality of tea. This involves blending low grade green and black bulk tea, moistening the mixture to 10–15% water content, then drying and heating it. There is no mention of catechin to phenol ratios.

British patent specification GB-A-04831 (Jackson) discloses a method for improving the 'richness' of tea and neutralising the action of tannin. This involves blending tea with a preparation of flour, grapes and nutes. Once again there is no mention of catechin to phenol ratios. It is not clear whether the tea is green or black.

The present invention however involves carefully selecting certain black and certain green teas and blending them to provide a rapidly infusible leaf tea product from which one can prepare a beverage that has an uncharateristically high amount of catechins and an enhanced antioxidant activity but still resembles black tea.

STATEMENT OF THE INVENTION

The present invention relates to a leaf tea comprising a blend of a first substantially fermented tea and a second substantially unfermented tea, characterised in that the blend contains catechins and phenols in a ratio of between 0.15 to 0.4, but preferably between 0.2 and 0.3. Such a product will resemble black tea but typically possess an antioxidant activity that is 10% or more higher than that of the same mass of the black tea alone.

"Leaf tea" for the purposes of this invention means a tea product that contains one or more tea origins in an uninfused form. It may comprise a mixture of tea origins at least some of which may be partially or completely fermented. It may also include material derived from another plant product that contains catechins.

The leaf tea is preferably prepared by blending substantially fermented (ie black) and substantially unfermented (ie green) tea. The black tea is preferably low grown and the green tea is preferably an Assam jat. Both teas should be processed by the well known Cut, tear and curl method (CTC) to maximise the rate at which they will infuse in water.

The terms 'low grown' and 'high grown' are well known to those skilled in the art of tea blending and manufacture. However, for clarity 'low grown' typically means grown at altitudes below about 2,000 feet above sea level. Tea bushes that are low grown, for example in plains, tend to start producing in about two and a half years, and are fully developed a few years later. Most Taiwanese teas are low grown.

'High grown' typically means grown at altitudes above about 4,000 feet above sea level. Tea bushes that are high grown on hills for example sometimes take ten years to mature because of seasonal changes and cooler climate. The leaf however tends to be richer, more complex. High grown teas include those from the Darjeeling region of India.

DETAILED DESCRIPTION OF THE INVENTION

The present inventors began their investigations by analysing the chemical content of a broad range of teas or "tea origins". This included 98 green teas, 11 oolong teas and 15 black teas from India (Assam, South), Bangladesh, Sri Lanka, China, Japan, Taiwan, Vietnam, Indonesia, Kenya, Malawi, Turkey and Argentina. They used high performance liquid chromatography (HPLC) to separate, identify and measure the levels of certain catechins (for example EGC, EC, EGCG and ECG), total catechins, total phenols, gallic acid, caffeine etc.

It was found that black tea typically contains catechins and phenols in a ratio of less than 0.15 and usually less than 0.1. This is probably because the fermentation process significantly decreases the level of catechins. Green tea however typically contains catechins and phenols in a ratio that is greater than 0.60. This probably represents the level of catechins that has withstood the processing that precedes fermentation. The same ratio in oolong tea tended to be between 0.45 and 0.6.

The banding of ratios of the black, oolong and green teas was surprisingly distinct. In the case of green tea however the band was very broad with some tea origins having catechin to phenol ratios approaching 1. There were some anomalies but these were very few. For example, the ratio of catechins to phenols in Black Uva from Ceylon and Black Darjeeling from India at 0.40 and 0.32 respectively were greater than 0.15 but still well below the typical minima for oolong and green teas. Both tea origins are high grown and would tend to have higher catechin levels anyway.

It was clear from these results that green tea with its high catechin content could be used to supplement the catechin levels of black tea. The catechin content of different tea origins can differ widely so the choice of green tea origin is critical. Naturally those green tea origins that have catechin contents that are greater than the average will be of special interest.

The inventors then surprisingly found that a leaf tea that contains catechins and phenols in a ratio of between 0.15 to 0.4, but preferably between 0.2 and 0.3 resembles black tea but typically possesses an antioxidant activity that is 10% or more higher than that of the same mass of the black tea alone.

One could carefully and gradually ferment a tea until one has achieved the desired ratio of catechins to phenols that exhibits the advantages of the present invention. However it is far simpler and certainly more practical on anything but a laboratory scale to reliably arrive at the same result by blending certain black and green teas. The present inventors considered merely selecting partially fermented tea (ie oolong) but they found they tend to contain catechins and phenols in a ratio between about 0.45 and 0.60 and are thus unsuitable for the purposes of the invention.

The relative proportions of the various catechins can also be very important. Epigallocatechin-3-O-gallate (EGCG) exhibits a particularly high antioxidant level and given its suggested favourable biological activity the green tea of choice should have contain a high EGCG content. Epigallocatechin (EGC) also possesses antioxidant activity (although typically lower than that EGCG) and so the green tea of choice should preferably contain a high level of that catechin. On the other hand epicatechin-3-O-gallate (ECG) is believed to be at least partly responsible for giving tea its bitter taste. The green tea of choice should therefore contain this catechin in low levels.

The present inventors have found that Indian green teas, particularly Assams, tend to contain more EGCG and EGC than teas grown elsewhere. They also tend to contain less ECG but that is less marked. Those of an Assam jat have been found to have particularly high levels of EGCG and EGC and very low levels of ECG and are overall the most preferred green teas for the purposes of the present invention.

It is well known that green tea infuses much slower than black tea. The tea from which green tea beverages are made are typically grown in China or Japan. Teas from those countries are particularly slow to infuse; a fact that has influenced the way in which Chinese and Japanese prepare and drink their tea, ie they serve successive brews from the same leaves. The present inventors therefore believe that a skilled blender of teas would probably dismiss including a green Indian tea in a black tea blend for use by convenience conscious Westerners, a green tea from India rather than China or Japan even more so.

For the purposes of the invention the choice of the black tea is less critical. This is probably because the green tea provides the bulk of the catechins and the banding of catechin to phenol ratios of at least the black teas that the inventors analysed was much narrower than that of the green teas. High grown tea is however not preferred insofar as it tends to infuse very slowly.

The blending can be achieved by any art-known method. However subjecting the green tea to CTC (Cut-tear-curl) processing can be useful in increasing the rate of infusion. The black and green teas can be blended prior to, during or after the CTC process.

In another aspect of the present invention the inventors have found that blending at least certain green and black teas gives rise to a synergistic increase in the linalool content of the mixture of teas. This is accompanied by a synergistic decrease in the amounts of trans-2-hexenal and hexanal that can be measured in the mixture. This is significant in the context of the present invention as linalool is believed to be primarily responsible for the distinctive aroma of black tea. This is evident as a floral, lemon note which consumer data indicates is a desirable characteristic of tea and tea based beverages.

Aroma is influenced by genetic, cultural, and manufacturing variables. It can have a profound influence on a consumer's perception of quality and even taste. Small-leaved tea origins that grow in areas that are subject to cool periods are most likely to develop the best aroma. These aromas are generated during fermentation. That is probably partly responsible for Western people generally disliking green tea.

Linalool ($C_{10}H_{18}O$) is present in many essential oils. It is primarily responsible for the floral and lemon notes that is distinctive of black tea and considered a desirable characteristic of tea based beverages. Phenylacetaldehyde is known to contribute to that aroma but to a lesser extent. This increase is favourable given the present invention concerns providing a leaf tea from which one can prepare a beverage that looks, tastes and smells like black tea. Example 4 below shows that increase is a synergistic one. Green tea probably contains the precursors of linalool and other aromatic compounds found in black tea which can be formed when they are brought into contact with the enzymes or other reactive chemical compounds that are generated during the fermentation of tea.

Trans-2-hexenal ($C_6H_{10}O$) and hexanal ($C_6H_{12}O$) are two of a number of aldehydes that are Strecker degradation products of glycine, alanine and other amino acids which are found in tea and oxidised by catechin quinones. These compounds are believed to be contribute to the green and leafy aroma of tea. This decrease is favourable given the present invention concerns providing a leaf tea from which one can prepare a beverage that looks, tastes and smells like black rather than green tea. Example 4 below shows the decrease is a synergistic one. This may be the result of the trans-2-hexenal and hexanal being rapidly oxidised or otherwise consumed by some of the enzymes or other reactive chemical compounds that are generated during the fermentation of tea.

The relative proportions of the black and green tea are those necessary to achieve a ratio of catechins to phenols of between 0.15 to 0.4, but preferably between 0.2 and 0.3. They will differ depending on the choice of black and green tea. Increasing the level of catechins beyond the broad range dramatically alters the taste profile of the final beverage. Although this is a matter of taste 'greeness' is not generally favoured by Western tea drinkers.

Other plant materials can provide a source of catechins. Grapes, particularly the skins of red grapes are rich in catechins. They may be blended with black and green teas in amounts that will achieve the desired ratio of catechins to phenols.

A leaf tea having the desired ratio of catechins to phenols can be used to prepare a variety of tea based products including tea powders or instant teas, tea concentrates and Ready-to-Drink teas. It may alternatively be packaged in a variety of art known delivery systems including tea bags, be they made of paper, plastics mesh, muslin etc; and infusers.

The invention will now be illustrated by way of the following Examples.

EXAMPLE 1

A number of green, black and oolong teas were obtained and the total catechin and phenol contents were determined after exhaustive extraction. It can be seen that the green teas have a very high catechin/phenols ratio, whereas black teas typically possess a very low ratio (<0.2). However Darjeeling is an exception to this and has a ratio more characteristic of green or Oolong tea.

The results of the extractions are given in Table 1 below.

In this and subsequent experiments the catechin content was determined in accordance with the following methodology:

1. Sample Preparation
1.1 Freeze Dried Tea Powders

Freeze tea powder (45 mg) was dissolved in stabiliser solution (10% acetonitrile (v/v), 250 ppm ascorbic acid and 250 ppm EDTA) to give a final sample concentration of 5 mg/ml. The sample was then sonicated for 15 minutes at ambient temperature, prior to the removal of insoluble solids via centrifugation (13,000 rpm, 15 minutes (SANYO MICRO-TAUR™ centrifuge)).

1.2 Total Extraction of Leaf Catechins

Tea leaf (200 mg) was extracted with methanol/water (70% v/v, 5 ml) at 70 degrees Celsius for 5 minutes. The extract was decanted into a graduated container and the extraction repeated twice more. The combined extracts were allowed to cool to room temperature and the final volume adjusted to 15 ml. This extract then had ascorbic acid and EDTA (250 ppm respectively) added to prevent catechin degradation.

1.3 Tea infusions

Tea infusions were prepared and prior to HPLC analysis were adjusted such that they were 10% acetonitrile (v/v) and 250 ppm ascorbic acid and EDTA.

| 2.1 Analysis Conditions | |
|---|---|
| HPLC System: | Binary Pump with Autoinjector with 200 µl, Column Oven and Single Wavelength UV Detector |
| Column | Nucleosil C18 5 micron 100 Angstrom |
| Column Dimensions | 150 × 4.6 mm |
| Column Temperature | 35 deg. C |
| Solvents: | |
| A | Acetic Acid:Acetonitrile:Water [2:8:90] |
| B | Acetonitrile:Water [80:20] |
| Time (minutes) | Solvent Composition |
| 0–10 | A: 100% B: 0% Equilibration prior to sample injection |
| 0.01–10.00 | A: 100% B: 0% |
| 10.01–25.00 | A: 68% B: 32% Linear gradient |
| 25.01–32.00 | A: 68% B: 32% |
| 32.01–34.00 | A: 100% B: 0% Linear gradient |

Detection UV@ 274 nm.

Injection Conditions: Samples were prepared and analysed in duplicate, using an appropriate injection volume.

Peak Identification and Quantification:

The catechins were identified by the comparison of the retention times of sample components with those of authentic standards. These standards were obtained commercially, from the following suppliers: (−)-Epigallaocatechin gallate, (−)-Epicatechin gallate and (−)-Epigallocatechin (Roth Chemicals), and (+)-Catechin, (−)-Epicatechin, Gallic acid and Caffeine (Sigma Chemicals).

Quantification was achieved by the use of calibration curves.

The phenol content was determined by the Folin-Denis method.

TABLE 1

Catechin/phenol content after exhaustive extraction

| Teas | | Catechins (%) | Phenols (%) | Ratio |
|---|---|---|---|---|
| A. | Orthodox China green | 13.5 | 15.3 | 0.882 |
| B. | Orthodox Assam green | 10.6 | 18.1 | 0.584 |
| C. | Assam CTC green (Indian) | 20.6 | 25.0 | 0.824 |
| D. | Assam CTC green (Kenyan) | 18.7 | 24.2 | 0.771 |
| E. | Darjeeling | 9.6 | 20.9 | 0.457 |
| F. | Standard black tea blend | 2.1 | 17.5 | 0.119 |
| G. | Oolong tea | 7.1 | 13.4 | 0.530 |

In each case the ratio of catechins to phenols falls outside the range of 0.15 to 0.4 that characterises the leaf tea of the present invention.

EXAMPLE 2

The following are examples of leaf teas of the present invention.

TABLE 2

Leaf teas of the invention

| Teas | Catechins (%) | Phenols (%) | Ratio |
|---|---|---|---|
| B + F (30/70) | 4.7 | 17.7 | 0.266 |
| C + F (15/85) | 4.9 | 18.6 | 0.263 |
| D + F (15/85) | 4.6 | 18.5 | 0.249 |
| B + F (30/70) | 7.7 | 19.8 | 0.389 |
| C + F (30/70) | 7.1 | 19.6 | 0.362 |
| E + F (50/50) | 5.9 | 19.2 | 0.307 |
| E + F (30/70) | 4.35 | *.5 | 0.235 |
| G + F (70/30) | 3.6 | 16.3 | 0.22 | where
B = Orthodox Assam green
C = Assam CTC green (Indian)
D = Assam CTC green (Kenyan)
E = Darjeeling
F = Standard black tea blend
G = Oolong tea In each case the ratio of catechins to phenols falls within the range of 0.15 to 0.4 that characterises the leaf tea of the present invention.

EXAMPLE 3

A selection of green and black teas were thoroughly extracted using 70% methanol and the resulting extracts analysed in terms of their content of phenols and catechins by HPLC. An Indian green tea (Assam jat) was mixed with a black tea TB4 in a ratio of 30 to 70 by weight to provide a blend which was subjected to the same extraction and analysis. The results of the analysis are given below in Table 3.

TABLE 3

Analysis after total catechin and phenol extraction

| Sample Description | Catechins | | | | | Total Phenolics | % Catechins against |
|---|---|---|---|---|---|---|---|
| | EGC | EC | EGCG | ECG | Total* | (Folin-Denis) | Total Phenolics |
| Black Tea TB4 | 0.18 | 0.20 | 0.94 | 0.62 | 2.1 | 17.5 | 11.9 |
| Indian Green | 1.47 | 0.53 | 6.88 | 1.56 | 10.6 | 18.1 | 58.4 |
| 30:70 Indian Green: TB4 | 0.56 | 0.32 | 2.75 | 0.93 | 4.7 | 17.7 | 26.6 |
| S. Indian Green | 2.83 | 1.05 | 5.93 | 1.42 | 11.5 | 18.2 | 63.1 |
| Darjeeling Fannings | 0.56 | 0.32 | 6.53 | 2.14 | 9.6 | 20.9 | 45.7 |
| Green Clone TL1 | 3.53 | 1.51 | 9.91 | 3.54 | 19.0 | 25.3 | 75.2 |
| Green Clone 31/8 | 4.86 | 1.15 | 10.51 | 1.84 | 18.7 | 24.2 | 77.1 |
| Green Clone 35 | 4.35 | 1.65 | 9.17 | 2.62 | 18.3 | 24.7 | 73.9 |
| Black Tea TB4 & Indian Green Tea Blend | | | | | | | |
| 30% Indian Green | 0.44 | 0.16 | 2.06 | 0.47 | 3.2 | 5.4 | 59.3 |
| 70% TB4 | 0.13 | 0.14 | 0.66 | 0.43 | 1.5 | 12.3 | 12.2 |
| Expected Blend | 0.57 | 0.30 | 2.72 | 0.90 | 4.7 | 17.7 | 26.6 |

(* This total includes catechins in addition to EGC, EC, EGCG and ECG)

The ratio of catechins to phenols was about 0.12 for the "pure" black tea, greater than 0.58 for the "pure" green teas but 0.27 for the 30%/70% blend of black and green tea.

Equal amounts of each tea were infused in boiling water in order to prepare beverages. The green teas yielded beverages that were pale in colour. It was visibly noticeable that they developed more colour when left undisturbed for several minutes. But they were still a pale green. The black tea infused more rapidly to provide a rich red/brown colour. Any further increase in colour after than was marginal to the eye. The beverage that was prepared from the blend of black and green tea showed a similar rapid generation of a red/brown colour. The rate of infusion and extent as evidenced by the colour of the beverage was not noticeably different from that of the black tea.

EXAMPLE 4

The chemical content of various black, green and blends of black and green tea was determined by gas liquid chromatography. The black tea was a blend of black tea that is commercially available from Van den Bergh Foods Ltd in the United Kingdom under the trade mark "PG TIPS"™. The green tea was an Indian green tea. The blends were made from mixtures of the two teas with a ratio of catechins to phenols of 0.36. The results of a chromatographic analysis are given in Table 4 below.

TABLE 4

GLC analysis of black, green and black/green blends

| Compound/tea | blk | green | 10% gr | 30% gr | 50% gr |
|---|---|---|---|---|---|
| Linalool | .18 | .035 | .154 | .163 | .19 |
| E-2-Hexenal | .237 | 0 | .099 | .066 | .037 |
| Hexanal | .238 | .041 | .131 | .08 | .052 |

(NB 10% gr means a blend of 10% green and 90% black, by weight etc)

These results show that the linalool content of a black tea increases when that tea is blended with a green Indian tea. The extent of the increase exceeds what one would expect by a mere admixture. This is clearly seen when the 50:50 blend contains even more linalool that 100% black tea.

These results also show that the content of both trans-2-hexenal and hexanal in the black tea decreases when that tea is blended with a green Indian tea. The extent of the decrease exceeds what one would expect by a mere admixture. Focusing on the 50:50 blend again it can be seen that the content of both trans-2-hexenal and hexanal in the blend is significantly less than half that of the 100% black tea.

EXAMPLE 5

A number of green, black and oolong teas were obtained and the total catechin and phenol contents were determined after a three minute infusion in water. All blends were studied at a 30/70 ratio for comparative purposes.

The data presented in table 5 below shows that whilst the above blends deliver the ratio of catechins/phenols that characterises the leaf teas of the present invention, the highest delivery of catechins is obtained when green tea from Assam rather than China jat is used and prepared by a CTC rather than orthodox manufacturing process.

TABLE 5

Comparison of infusion performance of blends

| Tea | Total catechins extracted after 3 min infusion | |
|---|---|---|
| | (% wt/wt of tea) | % increase |
| F | 2.39 | — |
| A + F | 4.04 | 169% |
| B + F | 4.15 | 174% |
| D + F | 5.01 | 210% |
| C + F | 5.57 | 233% |

Where
A = Orthodox China green
B = Orthodox Assam green
C = Assam CTC green (Indian)
D = Assam CTC green (Kenyon)
F = Standard black tea blend

EXAMPLE 6

The infusion performance of selected tea blends is presented in table 6 below, with respect to total catechin and total antioxidant data. Once again all blends were studied at 30/70 ratio for comparative purposes.

The antioxidant activity of tea was measured as described by Miller & Rice-Evans, 1996. The technique measures the relative abilities of antioxidants to scavenge the 2,2'-azino-bis (3-ethylbenz-thiazoline-6-sulfonic acid) (ABTS) radical cation in comparison with the antioxidant potency of standard amounts of Trolox, the water soluble vitamin E analogue. During the reaction, antioxidants present in the sample react with the ABTS radical cation as it is generated, until all the antioxidant is consumed; thereafter the radical cation concentration progressively increases in the cuvette. The radical is blue/green in colour and the extent of colour formation is monitored at 734 nm. The assays were carried out using the automated protocol described in Miller & Rice-Evans, 1996. Miller, N J & Rice-Evans, C. (1996) "Spectrophotometric determination of antioxidant activity" a Redox Report 2:161–171.

TABLE 6

Antioxidant activity

| Tea | Total Antioxidant Activity (mM) after 3 min infusion | |
|---|---|---|
| | mM | % increase |
| F | 20.5 | — |
| A + F | 20.65 | +0.7% |
| B + F | 20.75 | +1.2% |
| D + F | 24.27 | +18.4% |
| C + F | 24.58 | +19.9% |

Where
A = Orthodox China green
B = Orthodox Assam green
C = Assam CTC green (Indian)
D = Assam CTC green (Kenyan)
F = Standard black tea blend

EXAMPLE 7

The extent of gallation of a leaf tea is believed to be inversely proportional to bitterness. Gallation can be usefully measured in terms of the ratio of the mass of gallated catechins to the mass of non-gallated catechins.

The following table shows the gall/non-gall ratios of two tea clones. Clone 2, with the lower ratio is preferred as the gallated catechins are more bitter. Clone 1 is not preferred, but the ratio can be improved by tannase treatment.

TABLE 7

| | Clone selection: Catechin levels of 2 clones differing in gall./non gall. ratio | | |
|---|---|---|---|
| Tea | Gall. catechins | Non-gall. catechins | Ratio |
| Clone 1 | 18.43 | 3.59 | 5.13 |
| Clone 2 | 11.62 | 5.07 | 2.29 |

We claim:

1. A leaf tea comprising a blend of a fermented tea and an unfermented tea, characterized in that the blend contains catechins and phenols in a ratio of between 0.15 to 0.4.

2. A leaf tea as claimed in claim 1 wherein the fermented tea is a low grown black tea.

3. A leaf tea as claimed in claim 1 wherein the green tea is from an Assam jat.

4. A fast infusing leaf tea comprising a blend of green Assam tea and black tea in proportions that contain catechins and phenols in a ratio of between 0.15 to 0.4 and delivers at least 5.5% catechins per gram of tea after infusing in water for 3 minutes.

5. A fast infusing leaf tea comprising a blend of green Assam tea and black tea in proportions that contain catechins and phenols in a ratio of between 0.15 to 0.4 and provides at least a 10% increase in antioxidant activity compared to the mass of black tea after infusing in water for 3 minutes.

6. A leaf tea according to claim 1 further characterized by a synergistic increase in linalool in the blend.

7. A leaf tea according to claim 1 further characterized by a synergistic reduction in the content of trans-2-hexenal and hexanal, in the blend.

8. A tea based product that contains or is derived from a leaf tea as claimed in claim 1.

9. A tea based product as claimed in claim 8 wherein the product is a powdered tea, a tea concentrate, a ready to drink tea, or an infusion package.

10. A leaf tea as claimed in claim 1 wherein said ratio is achieved by blending the teas with another plant product that contains catechins.

11. A leaf tea according to claim 1 wherein the blend contains the catechins and the phenols in a ratio of 0.2 to 0.3.

12. A leaf tea according to claim 10 wherein said plant product is grape skins.

* * * * *